United States Patent
Inata

(10) Patent No.: US 11,719,285 B2
(45) Date of Patent: Aug. 8, 2023

(54) DAMPER DEVICE

(71) Applicant: Suzuki Motor Corporation, Hamamatsu (JP)

(72) Inventor: Hiroki Inata, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 921 days.

(21) Appl. No.: 16/653,002

(22) Filed: Oct. 15, 2019

(65) Prior Publication Data

US 2020/0124112 A1 Apr. 23, 2020

(30) Foreign Application Priority Data

Oct. 17, 2018 (JP) ................................. 2018-195893

(51) Int. Cl.
*B62M 21/00* (2006.01)
*F16D 7/08* (2006.01)

(52) U.S. Cl.
CPC ............... *F16D 7/08* (2013.01); *B62M 21/00* (2013.01)

(58) Field of Classification Search
CPC . F16D 7/08; F16D 7/005; F16D 7/024; F16D 7/042; F16D 7/06; F16D 43/2022; F16D 43/204; F16D 43/206; F16D 43/213; F16D 3/66
USPC ................................ 464/39, 34, 37, 38, 161
See application file for complete search history.

(56) References Cited

U.S. PATENT DOCUMENTS

| | | | | |
|---|---|---|---|---|
| 1,953,182 | A | * 4/1934 | Lyon | F16D 43/206 464/39 |
| 3,034,365 | A | * 5/1962 | Stieber | F16D 7/007 192/30 R |
| 3,298,481 | A | * 1/1967 | Schaedler | B25B 23/145 192/150 |
| 4,734,080 | A | 3/1988 | Kronert | |

(Continued)

FOREIGN PATENT DOCUMENTS

| | | |
|---|---|---|
| DE | 919330 C | 11/1954 |
| DE | 3009224 A1 | 9/1981 |

(Continued)

OTHER PUBLICATIONS

German Office Action for Application No. 102019120587.5, dated Jun. 30, 2021, 6 pages.

(Continued)

*Primary Examiner* — Greg Binda
(74) *Attorney, Agent, or Firm* — Lerner David LLP

(57) ABSTRACT

A damper device includes an input shaft member to which a driving force from a crankshaft of an internal combustion engine is input, an output shaft member capable of outputting the driving force transmitted from the input shaft member, an input side cam and an output side cam respectively connected to the input shaft member and the output shaft member, and a damper bearing pivotable on the input side cam or the output side cam, wherein a damper bearing assembly has a bearing shaft supporting a plurality of damper bearings, bearing axes of the plurality of damper bearings are arranged along a bearing shaft axis of the bearing shaft, the bearing shaft is orthogonal to a rotation axis, and a shaft support portion supporting the bearing shaft, is provided between the adjacent damper bearings of the damper bearing assembly.

6 Claims, 7 Drawing Sheets

(56) References Cited

U.S. PATENT DOCUMENTS

| | | | |
|---|---|---|---|
| 5,855,518 A | | 1/1999 | Tanaka et al. |
| 11,421,744 B2 * | | 8/2022 | Inata ..................... F16F 15/133 |
| 2016/0369867 A1 * | | 12/2016 | Leonard ............ F16F 15/13157 |
| 2018/0297184 A1 * | | 10/2018 | Bailey ....................... F16D 7/08 |

FOREIGN PATENT DOCUMENTS

| | | | |
|---|---|---|---|
| DE | 3325214 A1 | | 2/1985 |
| DE | 102007004703 B4 | | 12/2015 |
| DE | 102015205460 A1 | * | 9/2016 |
| FR | 625008 A | | 8/1927 |
| GB | 2071236 A | | 9/1981 |
| JP | 58061338 A | * | 10/1981 |
| JP | H0932864 A | | 2/1997 |
| JP | 2013053673 A | | 3/2013 |
| JP | 2014070649 A | | 4/2014 |
| WO | WO-2010139081 A1 | * | 12/2010 ........... F16D 43/206 |

OTHER PUBLICATIONS

Indian Office Action for Application No. 201914037331, dated Sep. 2, 2020, 6 pages.

* cited by examiner

DAMPER DEVICE

CROSS-REFERENCE TO RELATED APPLICATIONS

This application claims the benefit of the filing date of Japanese Patent Application Serial No. 2018-195893, filed on Oct. 17, 2018, the disclosure of which is hereby incorporated herein by reference.

TECHNICAL FIELD

The present invention relates to a damper device having: an input shaft member to which the rotational driving force of an internal combustion engine is input; and an output shaft member which outputs the rotational driving force transmitted from the input shaft member, the damper device capable of transmitting the rotational driving force between the input shaft member and the output shaft member.

BACKGROUND ART

To efficiently transmit the rotational driving force of an internal combustion engine, such as an engine, to the exterior thereof, a damper device is sometimes installed on the transmission route of the rotational driving force. Typically, the damper device has: an input shaft member to which the rotational driving force of an internal combustion engine is input; an output shaft member which outputs the rotational driving force transmitted from the input shaft member; and a damper mechanism capable of efficiently transmitting the rotational driving force between the input shaft member and the output shaft member. This damper device and, in particular, the damper mechanism thereof is required to prevent: torque fluctuation of the internal combustion engine; rotational speed fluctuation thereof; vibration due to these fluctuations; and/or the like, from being transmitted between the input shaft member and the output shaft member. Therefore, various damper devices intended for satisfying this requirement, have been proposed.

Examples of damper devices include a damper device comprising a damper mechanism including: a first cam surface on an input shaft side; a second cam surface on an output shaft side opposite the first cam surface; a plurality of rollers located between the first and second cam surfaces; and a retainer located between the first and second cam surfaces so as to be spaced apart from them, the retainer configured so as to retain a plurality of rollers, and the damper device is configured such that: each roller is rotatable around a rotary center axis thereof; the rotary center axes of a plurality of rollers are arranged radially using the axes of the input shaft and the output shaft as a reference; a plurality of through-holes extends along the direction of the axes of the input shaft and the output shaft so as respectively correspond to the plurality of rollers; and in a state in which the retainer is not fixed in position in the direction of the axes of the input shaft and the output shaft between the first and second cam surfaces, and the plurality of rollers are arranged in the through-holes of the retainer, the plurality of rollers roll on the first and second cam surfaces as the input shaft and the output shaft rotate. (See, for example, patent publication JP H09-32864 A).

SUMMARY OF THE INVENTION

Technical Problem

However, in the above-described example of the damper device, to roll the rollers while the rollers are arranged in the through-holes of the retainer respectively, it is necessary to provide clearance between the rollers and the peripheral edge portions of the through-holes of the retainer. Due to the clearance, play is generated between the rollers and the peripheral edge portions of the through-holes of the retainer. This play may cause the rolling of the rollers to be unstable, and may cause friction between the rollers and the first and second cam surfaces to increase. Furthermore, this may cause friction loss. Therefore, in the above-described example of the damper device, the rotational driving force may not be efficiently transmitted between the input shaft and the output shaft. In particular, the torque fluctuation of the internal combustion engine, rotational speed fluctuation, vibration due to these fluctuations, and/or the like may not be efficiently prevented from being transmitted between the input shaft and the output shaft.

In addition, in the above-described example of the damper device, it is necessary to assemble the damper device such that the plurality of rollers and the retainer are arranged between the first and second cam surfaces in a state in which the plurality of rollers are respectively arranged in the plurality of through-holes of the retainer. This assembling operation is difficult, and as a result, the manufacturing efficiency of the damper device may deteriorate.

In view of the abovementioned circumstances, in a damper device, it is desirable that the rotational driving force can be efficiently transmitted between the input shaft member and the output shaft member, and that manufacturing efficiency can be improved.

Solution to the Problem

To solve the abovementioned problem, a damper device according to an aspect of the present invention includes: an input shaft member rotatable around a rotation axis such that a driving force of an internal combustion engine is input to the input shaft member; an output shaft member rotatable around the rotation axis such that the driving force which was transmitted via the input shaft member, is output from the output shaft member; an input side cam and an output side cam arranged between the input shaft member and the output shaft member so as to respectively have opposing portions opposite each other in a rotation axis direction along the rotation axis, the input side cam and the output side cam respectively connected to the input shaft member and the output shaft member; a damper bearing having an outer peripheral portion pivotable around a bearing axis on an opposing portion of one of the input side cam and the output side cam, the outer peripheral portion arranged between the opposing portions of the input side cam and the output side cam in the rotation axis direction; and an urging member urging the output side cam such that an opposing portion of the other of the input side cam and the output side cam abuts the outer peripheral portion of the damper bearing, wherein a damper bearing assembly including a plurality of the damper bearings, is provided, the damper bearing assembly has a bearing shaft supporting the plurality of damper bearings, in the damper bearing assembly, bearing axes of the plurality of damper bearings are arranged along a bearing shaft axis extending in the longitudinal direction of the bearing shaft, and the plurality of damper bearings are arranged at intervals along the bearing shaft axis; the bearing shaft axis of the bearing shaft of the damper bearing assembly is arranged orthogonal to the rotation axis, and a shaft support portion supporting the bearing shaft is provided between the damper bearings of the damper bearing assembly, which are adjacent to each other.

Advantageous Effects of the Invention

In a damper device according to an aspect, rotational driving force can be transmitted between the input shaft member and the output shaft member, and manufacturing efficiency of the damper device can be improved.

DETAILED DESCRIPTION

The damper devices according to the First and Second Embodiments will be described together with the vehicle engines to which these damper devices are respectively mounted. The damper device according to the present invention can also be mounted to an internal combustion engine other than a vehicle engine, such as an automotive engine.

First Embodiment

The damper device according to the First Embodiment will be described together with the vehicle engine to which this damper device is mounted.

Outline of the Damper Device and the Engine

Figure 1:
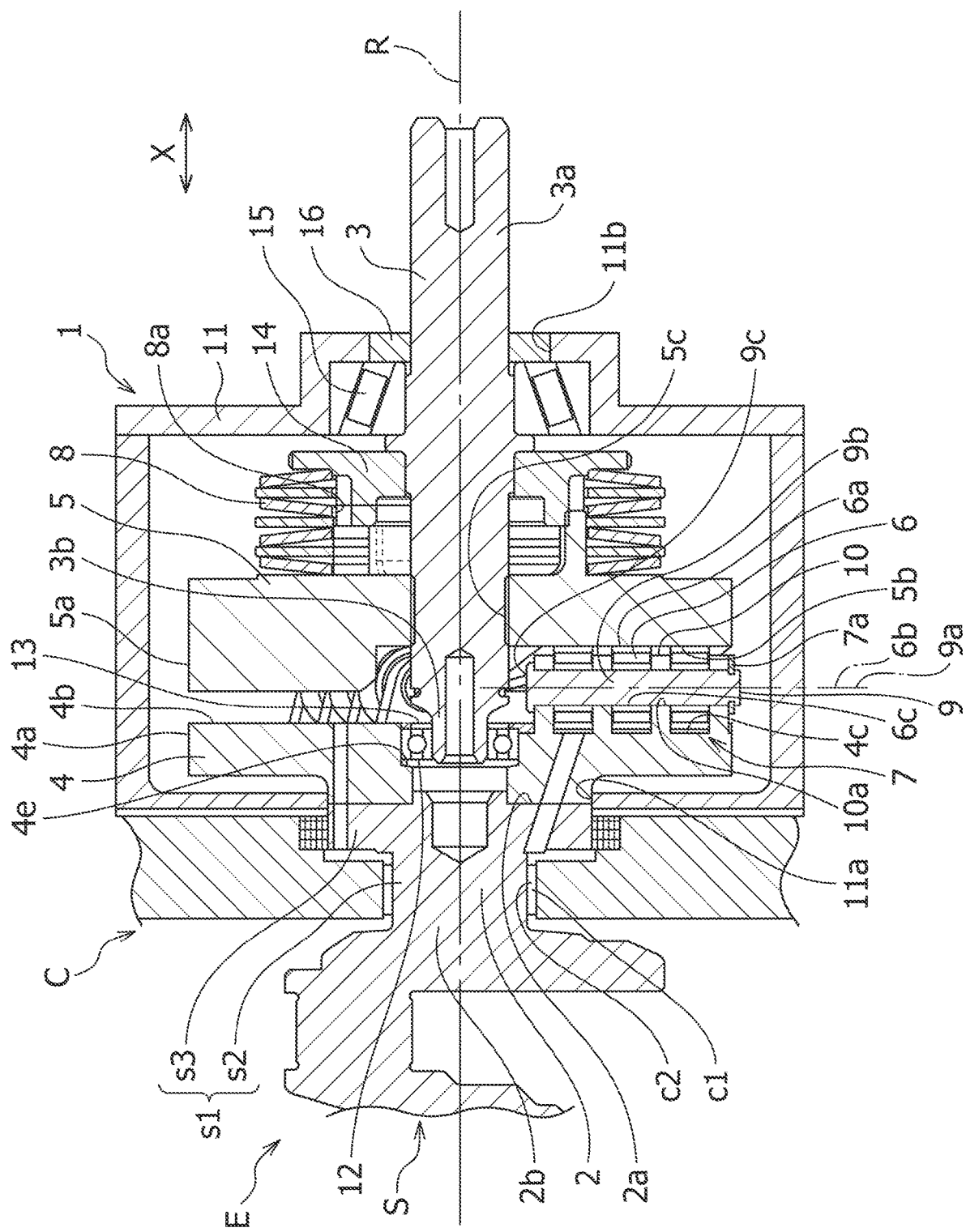
FIG. 1 is a sectional view, taken along a rotation axis, schematically showing a damper device according to the present Embodiment together with a part of a crankcase and a part of a crankshaft.

With reference to FIGS. 1 to 5, a damper device 1 according to the present Embodiment and a vehicle engine E will be described schematically. As shown in FIG. 1, the damper device 1 is connected to a crankshaft S of the engine E. The crankshaft S is rotatable around a rotation axis R. In the following, the direction along the rotation axis R will be referred to as the rotation axis direction (indicated by arrow X).

The damper device 1 has an input shaft member 2 configured so as to be rotatable around the rotation axis R such that a driving force from the crankshaft S is input to the input shaft member 2. Furthermore, as shown in FIGS. 1 and 2, the damper device 1 has an output shaft member 3 configured so as to be rotatable around the rotation axis R such that the driving force transmitted from the input shaft member 2 can be output from the output shaft member 3.

The damper device 1 has an input side cam 4 and an output side cam 5 respectively connected to the input shaft member 2 and the output shaft member 3. The input side cam 4 and the output side cam 5 are arranged between the input shaft member 2 and the output shaft member 3. The input side cam 4 and the output side cam 5 respectively have opposing portions 4a and 5a opposite each other in the rotation axis direction.

Figure 2:
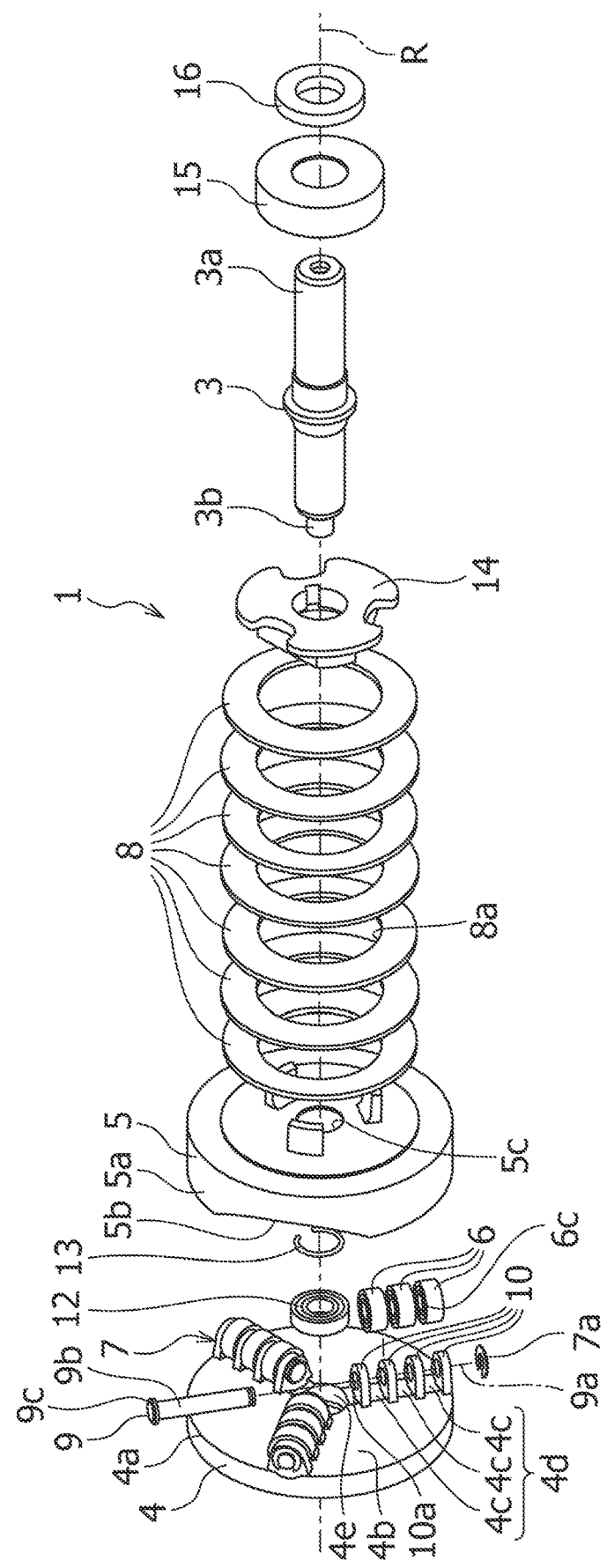
FIG. 2 is an exploded perspective view schematically showing the damper device according to the present Embodiment, while omitting an input shaft member and a damper case.
Figure 3:
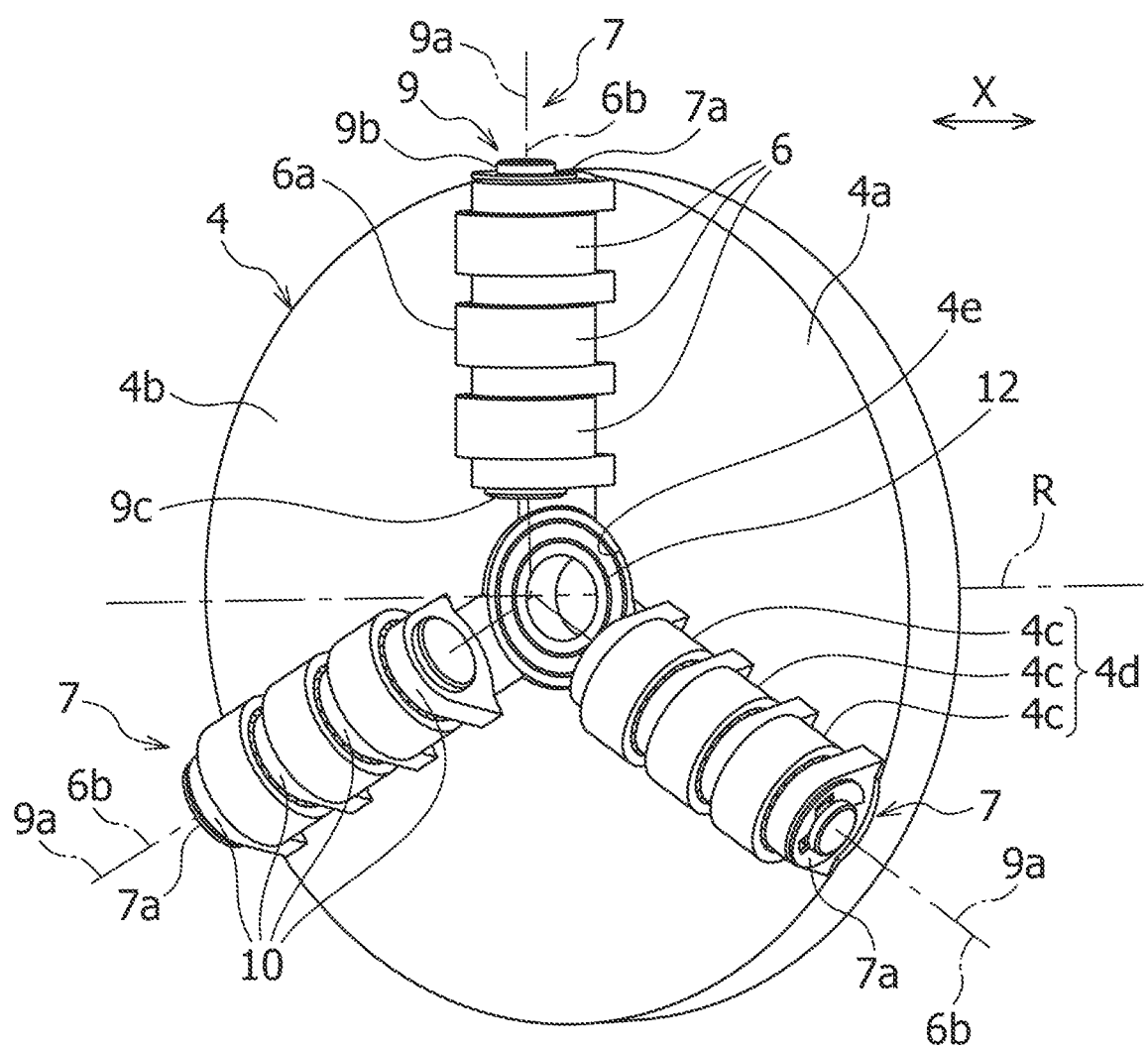
FIG. 3 is a perspective view schematically showing an input side cam, while damper bearing assemblies and an input side center bearing is mounted thereto, in the First Embodiment.
Figure 4:
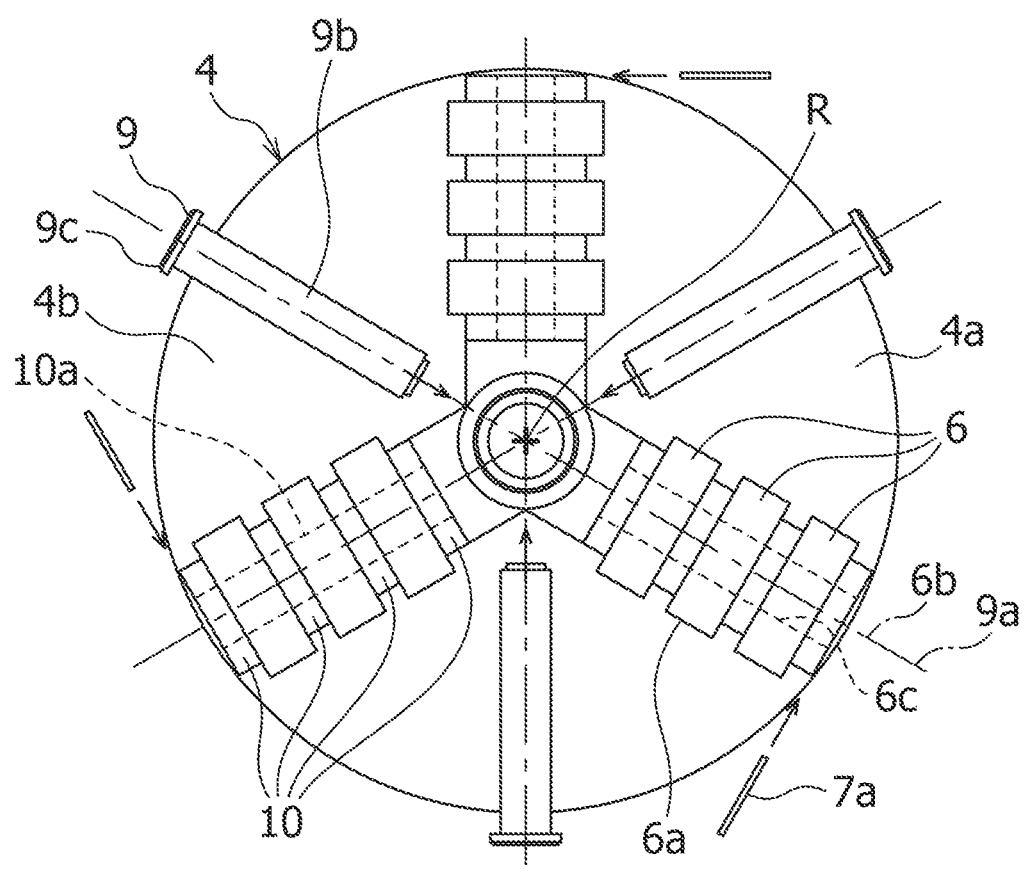
FIG. 4 is a diagram for explaining a damper bearing assembly assembling method according to the First Embodiment.

As shown in FIGS. 2 to 4, the damper device 1 comprises three damper bearing assemblies 7, each of which includes three damper bearings 6. The damper device, however, can comprise at least one damper bearing assembly including a plurality of damper bearings, more preferably, two or more damper bearing assemblies, and most preferably, three or more damper bearing assemblies. One damper bearing 6 is arranged between the opposing portions 4a and 5a of the input side cam 4 and the output side cam 5 in the rotation axis direction. Furthermore, the damper bearing 6 has an outer peripheral portion 6a configured so as to be pivotable around a bearing axis 6b on the opposing portion 4a of the input side cam 4. However, the outer peripheral portion of the damper bearing may be configured so as to be pivotable around the bearing axis on the opposing portion of the output side cam.

Furthermore, as shown in FIGS. 1 and 2, the damper device 1 has a Belleville spring 8 which is an urging member urging the output side cam 5 so as to cause the opposing portion 5a of the output side cam 5 to abut the outer peripheral portion 6a of the damper bearing 6. The damper bearing 6 can roll on the opposing portion 5a of the output side cam 5 in the state in which the outer peripheral portion 6a thereof is in contact with the opposing portion 5a of the output side cam 5. However, the urging member is not limited to this, and it may be a member other than a Belleville spring. In the case in which the outer peripheral portion of the damper bearing is pivotable around the bearing axis on the opposing portion of the output side cam, it is desirable for the urging member to urge the output side cam so as to cause the opposing portion of the input side cam to abut the outer peripheral portion of the damper bearing.

As shown in FIGS. 1 to 4, in the damper device 1, each damper bearing assembly 7 has a bearing shaft 9 configured so as to support a plurality of damper bearings 6. In the damper bearing assembly 7, the bearing axes 6b of a plurality of damper bearings 6 are arranged along a bearing shaft axis 9a extending in the longitudinal direction of the bearing shaft 9, and, furthermore, a plurality of damper bearings 6 are arranged at intervals along the bearing shaft axis 9a. The bearing shaft axis 9a is arranged so as to be substantially orthogonal to the rotation axis R. Between the adjacent damper bearings 6 of the damper bearing assembly 7, a shaft support portion 10 supporting the bearing shaft 9 is provided.

Figure 5:
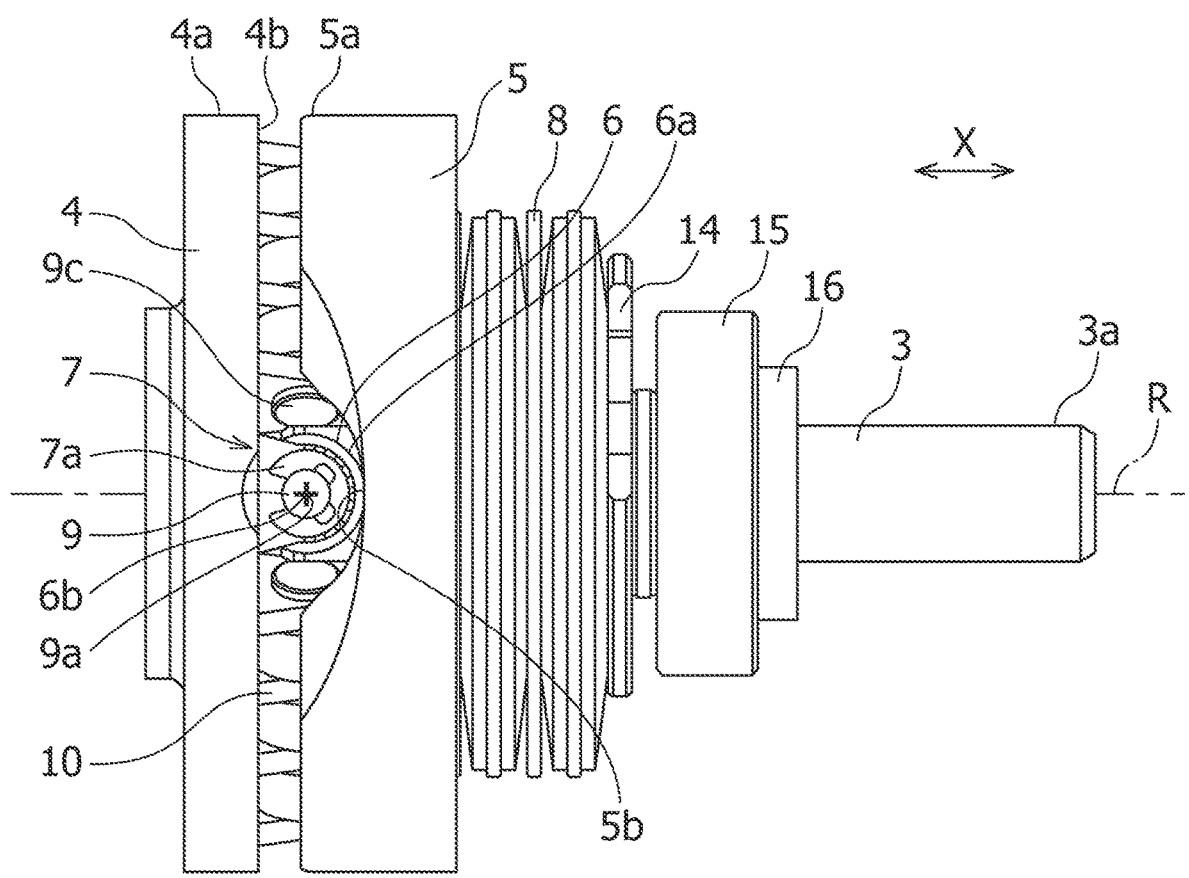
FIG. 5 is a side view schematically showing the damper device according to the First Embodiment, while omitting the input shaft member and the damper case.

Furthermore, the damper device 1 may be configured as follows. As shown in FIGS. 1 to 5, the damper bearing assemblies 7 are arranged so as to protrude from the opposing portion 4a of the input side cam 4. As shown in FIG. 5, the opposing portion 5a of the output side cam 5 has recesses 5b recessed in correspondence with the damper bearing assemblies 7 thus protruding. As shown in FIGS. 1 to 4, the shaft support portions 10 are connected to the opposing portion 4a of the input side cam 4.

However, the present invention is not limited to this structure. The damper bearing assemblies may be arranged so as to protrude from the opposing portion of the output side cam, the opposing portion of the input side cam may have recesses recessed in correspondence with the damper bearing assemblies thus protruding, and the shaft support portions may be connected to the opposing portion of the output side cam.

As shown in FIGS. 1 and 4, the bearing shaft 9 has a bearing shaft main body 9b extending along the bearing shaft axis 9a. The bearing shaft main body 9b is inserted into a plurality of damper bearings 6 so as to support the plurality of damper bearings 6. The bearing shaft 9 has a stopper 9c protruding from the proximal end portion, in the longitudinal direction, of the bearing shaft main body 9b in a direction orthogonal to the bearing shaft axis 9a. The bearing shaft main body 9b is inserted into a plurality of damper bearings 6 in a state in which the stopper 9c is located on the rotation axis R side of the bearing shaft main body 9b.

As shown in FIGS. 1 to 4, the damper device 1 has a plurality of damper bearing assemblies 7. The plurality of damper bearing assemblies 7 are arranged at intervals in a rotational peripheral direction around the rotation axis R. The plurality of damper bearing assemblies 7 are arranged substantially in rotational symmetry around the rotation axis R in a state in which no other damper bearing assembly 7 different from one damper bearing assembly 7, is arranged on the opposite side across the rotation axis from the one damper bearing assembly 7 in a rotational radial direction substantially orthogonal to the rotation axis R.

In one damper bearing assembly 7, the outer peripheral portions 6a of a plurality of damper bearings 6 are formed in a substantially ring-like configuration. The diameters of the outer peripheral portions 6a of the plurality of damper bearings 6 are substantially equal to each other.

Details of the Engine

With reference to FIG. 1, the details of the engine E may be formed as follows as described. One side end portion s1, in the rotational axis direction, of the crankshaft S of the engine E has a journal portion s2 rotatably supported by the crankcase C. Furthermore, the one side end portion s1 of the crankshaft S has a flange portion s3 located on one side in the rotational axis direction with respect to the journal portion s2. The flange portion s3 is formed so as to protrude in a rotational radial direction substantially orthogonal to the rotation axis R with respect to the journal portion s2.

The engine E has the crankcase C accommodating the crankshaft S. The crankcase C constitutes a part of the cylinder block of the engine E. However, the crankcase is not limited to this structure.

The crankcase C has a through-hole c1 extending therethrough along the rotation axis R. The through-hole c1 is formed in correspondence with the journal portion s2 of the crankshaft S. The crankcase C has a crank metal c2 arranged along the peripheral edge portion of the through-hole c1. The crank metal c2 rotatably supports the journal portion s2 of the crankshaft S.

Details of the Damper Device

With reference to FIGS. 1 and 2, details of the damper device 1 may be given as follows. As shown in FIGS. 1 and 2, the damper device 1 has seven Belleville springs 8. However, it is only necessary for the damper device to have at least one Belleville spring. In the case in which the damper device 1 has a plurality of Belleville springs 8, the plurality of Belleville springs 8 may be arranged in series in the rotation axis direction.

As shown in FIG. 1, the damper device 1 has a damper case 11 formed as a casing thereof. The damper case 11 has an input shaft insertion hole 11a and an output shaft insertion hole 11b extending through the damper case 11 so as to be respectively in correspondence with the input shaft member 2 and the output shaft member 3.

The input shaft member 2 and the output shaft member 3 are respectively inserted into the input shaft insertion hole 11a and the output shaft insertion hole 11b, and in this state, the damper case 11 can gather oil in the interior thereof. Furthermore, one side end portion 2a, in the rotation axis direction, of the input shaft member 2 is located within the damper case 11, and the other side end portion 2b, in the rotation axis direction, of the input shaft member 2 is located outside the damper case 11. One side end portion 3a, in the rotation axis direction, of the output shaft member 3 is located within the interior of the damper case 11, and the other side end portion 3b, in the rotation axis direction, of the output shaft member 3 is located outside the damper case 11.

As shown in FIGS. 1 and 2, the damper device 1 has an input side center bearing 12 arranged along the rotation axis R and mounted to the input side cam 4. The input side center bearing 12 rotatably supports the other side end portion 3b, in the rotation axis direction, of the output shaft member 3. Furthermore, the damper device 1 has a circlip (C-clip) 13 which is a retaining member for retaining the input side center bearing 12 with respect to the input side cam 4. The retaining member is not limited to this, and it may be a member other than a circlip.

The damper device 1 has a Belleville spring holder 14 for retaining the Belleville spring 8 so as to be elastically deformable with respect to the output side cam 5. This Belleville spring holder 14 may also be referred to as the urging member holder.

The damper device 1 has an output side center bearing 15 arranged along the rotation axis R and mounted to the damper case 11. The output side center bearing 15 is located at an interval on one side in the rotation axis direction with respect to the input side center bearing 12.

Furthermore, the damper device 1 has a damper oil seal 16 configured so as to prevent oil leakage between the output shaft member 3 and the output shaft insertion hole 11b of the damper case 11. The damper oil seal 16 is arranged along the peripheral edge portion of the output shaft insertion hole 11b. The damper oil seal 16 is located on one side in the rotation axis direction with respect to the output side center bearing 15.

In the damper device 1, the damper case 11 accommodates a part of the input shaft member 2, a part of the output shaft member 3, the input side cam 4, the output side cam 5, the damper bearing assemblies 7 each of which has the damper bearings 6 and the bearing shaft 9, the Belleville spring 8, the shaft support portions 10, the input side center bearing 12, the circlip 13, the Belleville spring holder 14, and the output side center bearing 15.

Details of the Input Shaft Member and the Output Shaft Member

With reference to FIGS. 1 and 2, the details of the input shaft member 2 and the output shaft member 3 may be given as follows. As shown in FIG. 1, the input shaft member 2 includes a flange portion s3 of the crankshaft S. The input shaft member 2 is integral with the flange portion s3 of the crankshaft S. In particular, it may fairly be said that the flange portion s3 constitutes the input shaft member 2.

As shown in FIGS. 1 and 2, the output shaft member 3 extends along the rotation axis R. The input shaft member 2 and the output shaft member 3 are arranged along the same rotation axis R and rotatable around the same rotation axis R. The output shaft member 3 is inserted into a through-hole 8a of the Belleville spring 8.

Details of the Input Side Cam

With reference to FIGS. 1 to 4, the details of the input side cam 4 may be formed as follows. As shown in FIG. 1, the input side cam 4 is arranged so as to abut the flange portion s3 of the crankshaft S in the rotation axis direction. The input side cam 4 is located on one side in the rotation axis direction with respect to the flange portion s3. The input side cam 4 is formed so as to protrude in the rotational radial direction with respect to the flange portion s3.

As shown in FIGS. 1 to 4, the opposing portion 4a of the input side cam 4 has an opposing surface 4b facing the opposing portion 5a of the output side cam 5. Furthermore, the opposing portion 4a of the input side cam 4 has receiving portions 4c each of which corresponds to the outer peripheral portion 6a of the damper bearing 6, each receiving portion 4c being recessed with respect to the opposing surface 4b of the input side cam 4 so as to be capable of receiving the damper bearing 6. The present invention, however, is not limited to this structure. In the case in which the damper bearing assemblies are arranged so as to protrude from the opposing portion of the output side cam, the opposing portion of the output side cam may have the receiving portions.

The opposing portion 4a of the input side cam 4 has nine receiving portions 4c corresponding to the nine damper bearings 6. The input side cam 4, however, can have n receiving portions 4c corresponding to m damper bearings 6 (m is a positive integer). The receiving portion 4c extends so as to have a substantially arcuate cross-sectional configuration. The axis of the receiving portion 4c is arranged so as to be substantially orthogonal to the rotation axis R and along the rotational radial direction.

The input side cam 4 has receiving portions 4c arranged adjacent to each other at an interval along the same axis. For example, in FIG. 2, the input side cam 4 has three receiving portion assemblies 4d each of which consists of three receiving portions 4c, and in each receiving portion assembly 4d, three receiving portions 4c are arranged at intervals along the same axis, while the input side cam 4 has receiving portions 4c arranged adjacent to each other at intervals along the same axis.

The opposing portion 4a of the input side cam 4 has a central accommodating portion 4e recessed along the rotation axis R so as to be in correspondence with the input side center bearing 12. The central accommodating portion 4e is formed so as to be capable of accommodating the entire input side center bearing 12. The central accommodating portion 4e is open at one side in the rotation axis direction. The opening peripheral edge portion of the central accommodating portion 4e is formed so as to allow mounting of the circlip 13.

Details of the Output Side Cam

With reference to FIGS. 1, 2, and 5, the details of the output side cam 5 may be given as follows. As shown in FIGS. 1 and 2, the output side cam 5 has a through-hole 5c extending through the output side cam 5 along the rotation axis R. The through-hole 5c is formed so as to be in correspondence with the output shaft member 3.

The output shaft member 3 is mounted to the output side cam 5 in a state in which it is movable in the rotation axis direction with respect to the output side cam 5 and it is inserted into the through-hole 5c so as to prevent movement in the rotational peripheral direction around the rotation axis R with respect to the output side cam 5. The output side cam 5 is located on the other side in the rotation axis direction with respect to the Belleville spring 8. The output side cam 5 is urged from one side toward the other side in the rotation axis direction by the Belleville spring 8. In particular, the output shaft member 3 presses a Belleville spring holder 14 from one side toward the other side in the rotation axis direction, and the Belleville spring holder 14 presses the Belleville spring 8 from one side toward the other side in the rotation axis direction, so that the Belleville spring 8 may urge the output side cam 5 from one side toward the other side in the rotation axis direction.

The opposing portion 5a of the output side cam 5 has three recesses 5b respectively corresponding to the three damper bearing assemblies 7. However, the opposing portion 5a of the output side cam 5 can have n recesses 5b corresponding to n damper bearing assemblies 7 (n is a positive integer). As shown in FIG. 5, each recess 5b of the output side cam 5 extends so as to have a substantially arcuate cross-sectional configuration. The axis of the recess 5b is substantially orthogonal to the rotation axis R and is arranged along the rotational radial direction.

Details of the Shaft Support Portion

With reference to FIGS. 1 to 4, the details of the shaft support portion 10 may be given as follows. As described above, the shaft support portions 10 are each provided between the adjacent receiving portions 4c. Apart from these shaft support portions 10 between the adjacent receiving portions 4c, there are further provided shaft support portions 10 on both sides in the bearing shaft axis direction along the bearing shaft axis 9a with respect to a plurality of damper bearings 6 of one damper bearing assembly 7.

A through-hole 10a extending through each shaft support portion 10 in the bearing shaft axis direction in correspondence with the bearing shaft 9, is formed on this shaft support portion 10. The shaft support portions 10 are formed integrally with the opposing portion 4a of the input side cam 4. The shaft support portions 10 are formed so as to protrude with respect to the opposing surface 4b of the input side cam 4. However, the present invention is not limited to this structure. In the case in which the damper bearing assemblies are arranged so as to protrude from the opposing portion of the output side cam, the shaft support portions may be formed to be integral with the opposing portion of the output side cam, and furthermore, the shaft support portions may be formed so as to protrude with respect to the opposing surface of the opposing portion of the output side cam.

Details of the Damper Bearing and Damper Bearing Assembly

With reference to FIGS. 1 to 4, the details of the damper bearings 6 and the damper bearing assemblies 7 may be given as follows. As shown in FIGS. 1 to 3, the outer peripheral portion 6a of the damper bearing 6 is rotatable around the bearing axis 6*b* of the damper bearing 6. The bearing axis 6*b* is substantially orthogonal to the rotation axis R and is arranged along the rotational radial direction. The damper bearing 6 is received by the receiving portion 4*c* of the input side cam 4 corresponding thereto. Furthermore, the damper bearing 6 is rotatably mounted to the input side cam 4.

As shown in FIGS. 1 to 4, one damper bearing assembly 7 has a circlip 7*a* which is a retaining member configured so as to be capable of being mounted to the distal end portion of the bearing shaft main body 9*b*. The retaining member is not limited to this one, and it may be a member other than a circlip. In one damper bearing assembly 7, a plurality of damper bearings 6 are arranged such that the bearing axes 6*b* thereof substantially coincide with the bearing shaft axis 9*a* of the bearing shaft 9. A through-hole 6*c* extending through the damper bearing 6 along the bearing axis 6*b*, is formed on the damper bearing 6.

Damper Bearing Assembly Assembling Method

An example of the method of assembling the damper bearing assembly 7 of the damper device 1 of the present Embodiment will be described with reference to FIGS. 3 and 4. In one damper bearing assembly 7, each damper bearing 6 is arranged at the receiving portion 4*c* of the input side cam 4 corresponding thereto. The bearing shaft 9 is arranged in a margin space which is on the opposite side across the rotation axis from one damper bearing assembly 7 in one rotational radial direction substantially orthogonal to the rotation axis R and in which another damper bearing assembly 7 different from the one damper bearing assembly 7 is not arranged. At this time, in the margin space, the bearing shaft 9 is arranged such that the distal end portion and the proximal end portion of the bearing shaft main body 9*b* are respectively directed to the inner peripheral side and the outer peripheral side in the rotational radial direction.

The bearing shaft main body 9*b* of the bearing shaft 9 is inserted into the through-holes 6*c* of a plurality of damper bearings 6 and into the through-holes 10*a* of a plurality of shaft support portions 10. In a state in which a stopper 9*c* of the bearing shaft 9 abuts the shaft support portion 10 located on the innermost peripheral side in the rotational radial direction from the inner peripheral side toward the outer peripheral side in the rotational radial direction, the circlip 7*a* is mounted to the distal end portion of the bearing shaft main body 9*b*. The circlip 7*a* abuts the shaft support portion 10 located on the outermost peripheral side in the rotational radial direction from the outer peripheral side toward the inner peripheral side in the rotational radial direction. As a result, one damper bearing assembly 7 is assembled. The rest of the plurality of damper bearing assemblies 7 are assembled in the same way as the one damper bearing assembly 7.

In the assembled state of the damper bearing assembly 7, the bearing shaft main body 9*b* is inserted into the through-holes 6*c* of the damper bearings 6 and the through-holes 10*a* of the shaft support portions 10, the stopper 9*c* located at the proximal end portion of the bearing shaft main body 9*b* abuts the shaft support portion 10 located on the innermost peripheral side in the rotational radial direction from the inner peripheral side toward the outer peripheral side in the rotational radial direction, and the circlip 7*a* located at the distal end portion of the bearing shaft main body 9*b* abuts the shaft support portion 10 located on the outermost peripheral side in the rotational radial direction from the outer peripheral side toward the inner peripheral side in the rotational radial direction. In this state, due to the circlip 7*a* and the stopper 9*c*, the bearing shaft 9 is not detached from the input side cam 4 in the rotational radial direction.

As described above, in the damper device 1 according to the present Embodiment, in one damper bearing assembly 7, a plurality of damper bearings 6 are supported by the bearing shaft 9 so as to be pivotable around the same bearing shaft axis 9*a*, each damper bearing 6 is supported by the shaft support portion 10 between the adjacent damper bearings 6, and, furthermore, the intermediate portion, in the longitudinal direction, of the bearing shaft 9 is supported by the shaft support portions 10 so as to enhance the support rigidity of the bearing shaft 9. As a result, it is possible to prevent the bearing shaft 9 from being bent due to the load from the Belleville spring 8. Therefore, in one damper bearing assembly 7, it is possible to cause a plurality of damper bearings 6 to roll efficiently on the opposing portion 4*a* or 5*a* of the input side cam 4 or the output side cam 5. As a result, even in the case in which there is generated thrust movement based on deviation between the input side cam 4 and the output side cam 5 due to rotational fluctuation in the input side cam 4, it is possible to efficiently transmit the rotation including the thrust movement from the input side cam 4 to the output side cam 5. Therefore, in the damper device 1, it is possible to efficiently transmit the rotational driving force between the input shaft member 2 and the output shaft member 3. Furthermore, one damper bearing assembly 7 can be easily assembled such that a plurality of damper bearings 6 are supported by the bearing shaft 9 and that the bearing shaft 9 is supported by the shaft support portions 10, so that it is possible to easily assemble the damper device 1. Therefore, it is possible to achieve an improvement in terms of the manufacturing efficiency of the damper device 1.

In the damper device 1 according to the present Embodiment, the damper bearing assemblies 7 are arranged so as to protrude from the opposing portion 4*a* of the input side cam 4, the opposing portion 5*a* of the output side cam 5 has the recesses 5*b* recessed in correspondence with the damper bearing assemblies 7, and the shaft support portions 10 are connected to the opposing portion 4*a* of the input side cam 4. Therefore, in the damper device 1, it is possible to efficiently transmit the rotational driving force between the input shaft member 2 and the output shaft member 3.

In the damper device 1 according to the present Embodiment, even in a case in which in the damper bearing assembly 7, there is exerted on the bearing shaft 9 a centrifugal force from the inner peripheral side toward the outer peripheral side of the damper device 1 due to the rotation of the input side cam 4 and the output side cam 5, the bearing shaft 9 is not detached from the input side cam 4 in the rotation axis direction thanks to the stopper 9*c* located at the proximal end portion of the bearing shaft main body 9*b*. Therefore, it is possible to stably maintain the state in which a plurality of damper bearings 6 are supported by the bearing shaft 9. Therefore, in the damper bearing assembly 7, it is possible to cause the plurality of damper bearings 6 to rotate efficiently on the opposing portion 4*a* or 5*a* of the input side cam 4 or the output side cam 5. As a result, as described above, in the damper device 1, it is possible to efficiently transmit the rotational driving force between the input shaft member 2 and the output shaft member 3.

In the damper device 1 according to the present Embodiment, to assemble the damper bearing assembly 7, the bearing shaft 9 is inserted into a plurality of damper bearings 6 from the inner peripheral side toward the outer peripheral side of the damper device 1 by utilizing the abovementioned margin space, and the distal end portion, in the longitudinal direction, of the bearing shaft main body 9b is fixed in position by the circlip 7a, whereby it is possible to reliably retain the plurality of damper bearings 6 between the circlip 7a at the distal end portion of the bearing shaft main body 9b and the stopper 9c at the proximal end portion of the bearing shaft main body 9b. Therefore, it is possible to easily assemble the damper device 1, so that it is possible to achieve an improvement in terms of manufacturing efficiency of the damper device 1.

Second Embodiment

A damper device according to the Second Embodiment will be described. The vehicle engine to which the damper device of the present Embodiment is mounted is the same as the vehicle engine related to the First Embodiment, so description thereof will be omitted. Except for the following points, the damper device of the present Embodiment is the same as the damper device of the First Embodiment. Therefore, in the following description, in the case in which components of the present Embodiment are the same as those of the First Embodiment, the names and reference numerals of the components of the present Embodiment are the same as those of the components of the First Embodiment.

Figure 6:
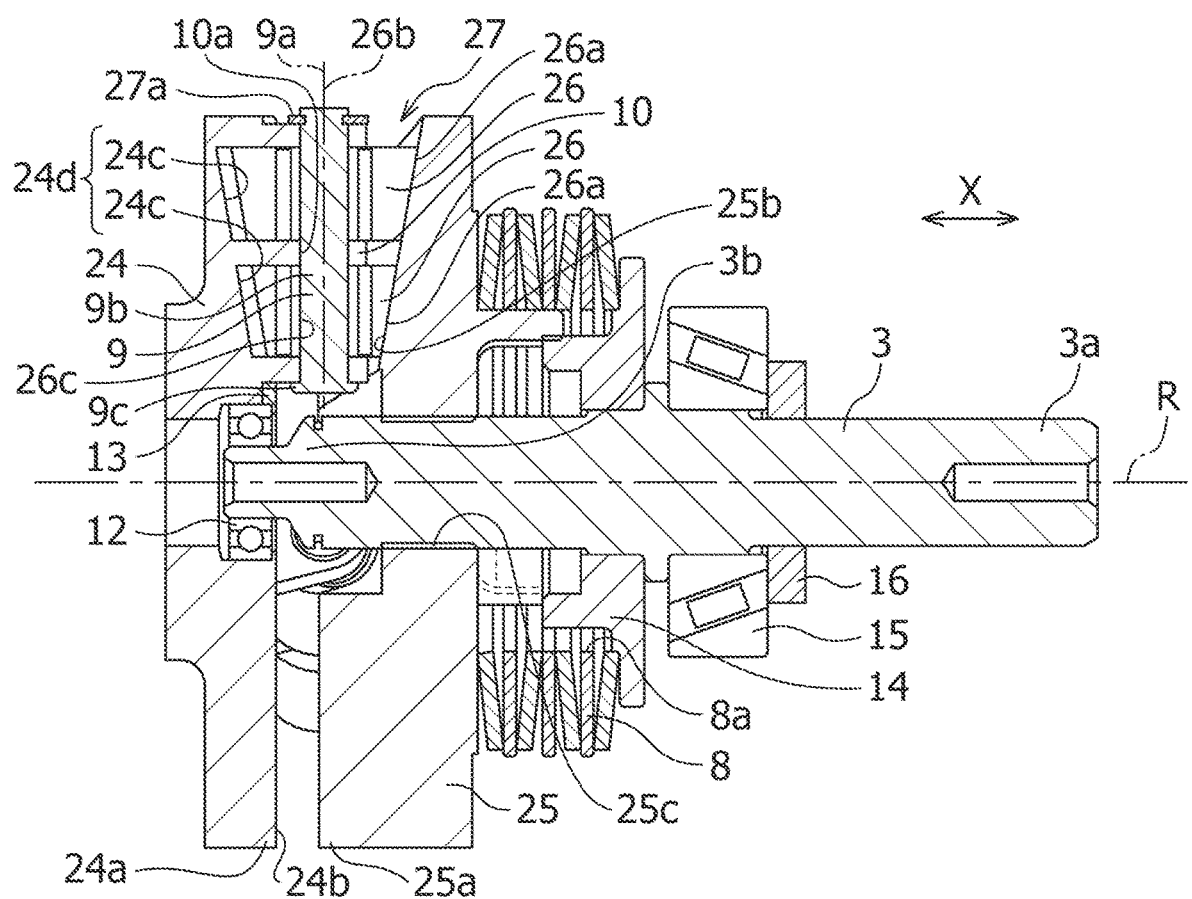
FIG. 6 is a sectional view, taken along the rotation axis, schematically showing a damper device according to a Second Embodiment, while omitting the input shaft member and the damper case.
Figure 7:
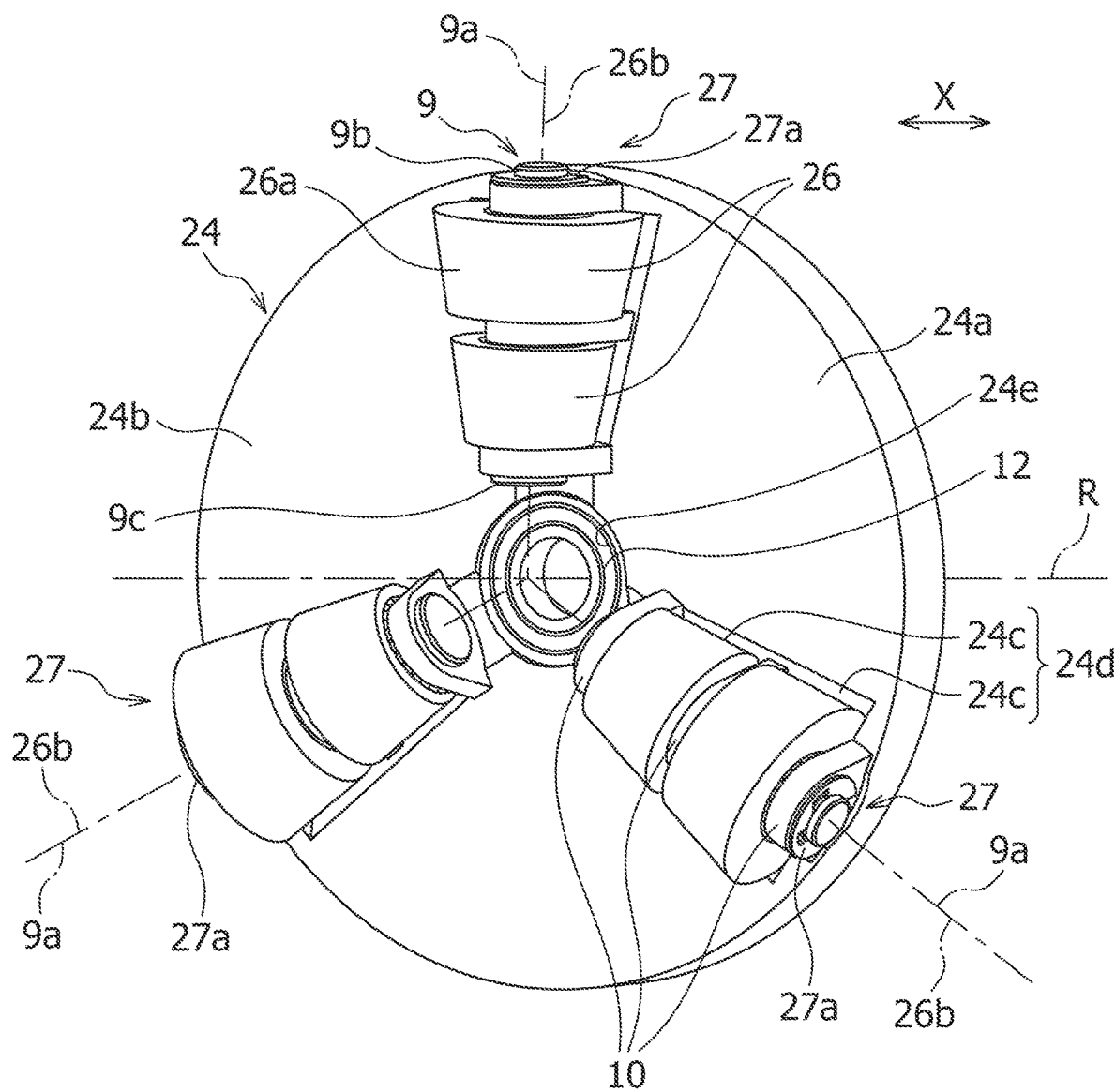
FIG. 7 is a perspective view schematically showing the input side cam, while the damper bearing assemblies being mounted thereto, in the Second Embodiment.

As shown in FIGS. 6 and 7, a damper device 21 according to the present Embodiment has damper bearing assemblies 27. Except for the following points, the damper bearing assembly 27 is the same as the damper bearing assembly 7 of the First Embodiment.

The damper bearing assembly 27 has two damper bearings 26. The damper bearing assembly may have a plurality of damper bearings. In one damper bearing assembly 27, outer peripheral portions 26a of the plurality of damper bearings 26 are inclined so as to gradually increase in size as they are spaced away from the rotation axis R. Except for this point, the outer peripheral portion 26a of the damper bearing 26 is the same as the outer peripheral portion 6a of the damper bearing 6 of the First Embodiment. Furthermore, except for this point, the damper bearing 26 and the damper bearing assembly 27 are also the same as the damper bearing 6 and the damper bearing assembly 7 of the First Embodiment.

The damper bearing 26 has a bearing axis 26b and a through-hole 26c being the same as the bearing axis 6b and the through-hole 6c of the damper bearing 6 of the First Embodiment respectively. The damper bearing assembly 27 has a circlip 27a being the same as the circlip 7a of the damper bearing assembly 7 of the First Embodiment.

The damper device 21 according to the present Embodiment has an input side cam 24. Except for the following points, the input side cam 24 is the same as the input side cam 4 of the First Embodiment. A receiving portion 24c of the input side cam 24 is formed in correspondence with the outer peripheral portion 26a of the damper bearing 26. The receiving portion 24c has a substantially arcuate cross-sectional configuration. Furthermore, the receiving portion 24c extends in such a manner that the cross-sectional surface thereof gradually increases in size as it is spaced away from the rotation axis R. Except for this point, the receiving portion 24c and the receiving portion assembly 24d of the input side cam 24 are the same as the receiving portion 4c and the receiving portion assembly 4d of the input side cam 4 of the First Embodiment.

Furthermore, the input side cam 24 has an opposing portion 24a, an opposing surface 24b, and a central accommodating portion 24e being the same as the opposing portion 4a, the opposing surface 4b, and the central accommodating portion 4e of the input side cam 4 of the First Embodiment.

The damper device 21 according to the present Embodiment has an output side cam 25. Except for the following points, the output side cam 25 is the same as the output side cam 5 of the First Embodiment. Recesses 25b of the output side cam 25 are formed in correspondence with the outer peripheral portions 26a of a plurality of damper bearings 26 of the damper bearing assembly 27. The recesses 25b each have a substantially arcuate cross-sectional surface. Furthermore, the recess 25b extends such that the cross-sectional surface thereof gradually increases in size as it is spaced away from the rotation axis R. Except for this point, the recess 25b of the output side cam 25 is the same as the recess 5b of the output side cam 5 of the First Embodiment.

Furthermore, the output side cam 25 has an opposing portion 25a and a through-hole 25c being the same as the opposing portion 5a and the through-hole 5c of the output side cam 5 of the First Embodiment respectively.

In addition to the same effect as that of the damper device 1 of the First Embodiment, the damper device 21 of the present Embodiment can provide the following effect. In the damper device 21 of the present Embodiment, in one damper bearing assembly 27, the outer peripheral portions 26a of a plurality of damper bearings 26 are inclined so as to gradually increase in size as they are spaced away from the rotation axis R. Therefore, in one damper bearing assembly 27, a plurality of damper bearings 26 can be caused to efficiently roll on the opposing portion 24a or 25a of the input side cam 24 or the output side cam 25. As a result, in the damper device 21, it is possible to efficiently transmit the rotational driving force between the input shaft member 2 and the output shaft member 3.

The present invention is not limited to the above-described Embodiments, and the present invention allows modification and alteration based on the technical idea thereof.

REFERENCE SIGNS LIST 1, 21 . . . Damper device, 2 . . . Input shaft member, 3 . . . Output shaft member, 4, 24 . . . Input side cam, 4a, 24a . . . Opposing portion, 4c, 24c . . . Receiving portion, 5, 25 . . . Output side cam, 5a, 25a . . . Opposing portion, 5b, 25b . . . Recess, 6, 26 . . . Damper bearing, 6a, 26a . . . Outer peripheral portion, 6b, 26b . . . Bearing axis, 7, 27 . . . Damper bearing assembly, 8 . . . Belleville spring (urging member), 9 . . . Bearing shaft, 9a . . . Bearing shaft axis, 9b . . . Bearing shaft main body, 9c . . . Stopper, 10 . . . Shaft support portion, E . . . Engine (Internal combustion engine), S . . . Crankshaft, R . . . Rotation axis

The invention claimed is:
1. A damper device comprising:
an input shaft member rotatable around a rotation axis such that a driving force of an internal combustion engine is input to the input shaft member;
an output shaft member rotatable around the rotation axis such that the driving force which was transmitted via the input shaft member, is output from the output shaft;
an input side cam and an output side cam arranged between the input shaft member and the output shaft member so as to respectively have opposing portions opposite each other in a rotation axis direction along the rotation axis, the input side cam and the output side cam respectively connected to the input shaft member and the output shaft member;

a damper bearing having an outer peripheral portion pivotable around a bearing axis on an opposing portion of one of the input side cam and the output side cam, the damper bearing arranged between the opposing portions of the input side cam and the output side cam in the rotation axis direction; and an urging member urging the output side cam such that an opposing portion of the other of the input side cam and the output side cam abuts the outer peripheral portion of the damper bearing, wherein a damper bearing assembly including a plurality of the damper bearings, is provided, the damper bearing assembly has a bearing shaft supporting the plurality of damper bearings, in the damper bearing assembly, bearing axes of the plurality of damper bearings are arranged along a bearing shaft axis extending in the longitudinal direction of the bearing shaft, and the plurality of damper bearings are arranged at intervals along the bearing shaft axis, the bearing shaft axis of the bearing shaft of the damper bearing assembly is arranged orthogonal to the rotation axis, and a shaft support portion supporting the bearing shaft, is provided between the damper bearings of the damper bearing assembly, which are adjacent to each other.

2. The damper device according to claim 1, wherein the damper bearing assembly is arranged so as to protrude from the opposing portion of the input side cam, the opposing portion of the output side cam has a recess recessed in correspondence with the damper bearing assembly, and the shaft support portion is connected to the opposing portion of the input side cam.

3. The damper device according to claim 1, wherein the bearing shaft has: a bearing shaft main body extending along the bearing shaft axis, the bearing shaft main body inserted into the plurality of damper bearings so as to support the plurality of damper bearings; and a stopper protruding from a proximal end portion in the longitudinal direction of the bearing shaft main body in a direction orthogonal to the bearing shaft axis, and the bearing shaft main body is inserted into the plurality of damper bearings in a state in which the stopper is closer to a side of the rotation axis than the bearing shaft main body.

4. The damper device according to claim 1, wherein a plurality of the damper bearing assemblies are arranged at intervals in a rotational peripheral direction around the rotation axis, and the plurality of damper bearing assemblies are arranged in rotational symmetry around the rotation axis in a state in which no other damper bearing assembly different from one damper bearing assembly, is arranged on the opposite side across the rotation axis from the one damper bearing assembly in a direction orthogonal to the rotation axis.

5. The damper device according to claim 1, wherein in the damper bearing assembly, outer peripheral portions of the plurality of damper bearings are inclined such that sizes of these outer peripheral portions gradually increase as these outer peripheral portions are spaced away from the rotation axis.

6. The damper device according to claim 1, wherein the shaft support portion is connected to the opposing portion of the input side cam or to the opposing portion of the output side cam.

* * * * *